United States Patent
Zhamu et al.

(12) United States Patent (10) Patent No.: US 12,357,043 B2
(45) Date of Patent: Jul. 15, 2025

(54) GRAPHITIC ANTIVIRAL FILTRATION ELEMENT AND FILTRATION DEVICES CONTAINING SAME

(71) Applicant: Nanotek Instruments Group, LLC, Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 464 days.

(21) Appl. No.: 16/844,062

(22) Filed: Apr. 9, 2020

(65) Prior Publication Data

US 2021/0316171 A1  Oct. 14, 2021

(51) Int. Cl.
*A41D 13/11* (2006.01)
*A62B 18/02* (2006.01)
(Continued)

(52) U.S. Cl.
CPC ...... *A41D 13/1192* (2013.01); *A41D 13/1161* (2013.01); *A62B 18/025* (2013.01);
(Continued)

(58) Field of Classification Search
CPC ..... A62B 23/025; A62B 18/025; A41D 13/11; A41D 13/1161; A41D 13/1192;
(Continued)

(56) References Cited

U.S. PATENT DOCUMENTS

| 3,613,678 A | 10/1971 | Mayhew | |
|---|---|---|---|
| 4,831,011 A * | 5/1989 | Oikawa | B01J 20/20 423/239.1 |

(Continued)

FOREIGN PATENT DOCUMENTS

| CN | 1539531 A | * | 10/2004 |
|---|---|---|---|
| CN | 104606802 A | * | 5/2015 |

(Continued)

OTHER PUBLICATIONS

CN109954329A_ENG (Espacenet machine translation of Huang) (Year: 2019).*

(Continued)

*Primary Examiner* — Gabriel E Gitman (57) ABSTRACT

Provided is filtration member for use in a filtration device, said filtration member comprising a layer of woven or nonwoven fabric having two primary surfaces and a layer of chemically functionalized graphite flakes deposited on at least one of the two primary surfaces or embedded in the layer of woven or nonwoven fabric, wherein said graphite flakes comprise chemical function contain 1%-50% by weight of a non-carbon element selected from O, N, H, F, Cl, Br, I, or a combination thereof. Also provided is a face mask comprising: (a) a mask body configured to cover at least wearer's mouth and nose; and (b) a fastener to hold the mask in place on the wearer's face; wherein the mask body includes (i) an air-permeable outer layer, (ii) an inner layer located on a wearer's side when the mask is worn, and (iii) the filtration member comprising graphite flakes.

16 Claims, 5 Drawing Sheets

(51) Int. Cl.
*A62B 23/02* (2006.01)
*B01D 39/08* (2006.01)
*B01D 39/16* (2006.01)
*B01D 46/00* (2022.01)
*B01D 46/54* (2006.01)
*B01J 20/20* (2006.01)
*B32B 5/16* (2006.01)
*B32B 9/04* (2006.01)
*B32B 9/06* (2006.01)
*C01B 32/194* (2017.01)

(52) U.S. Cl.
CPC .......... *A62B 23/025* (2013.01); *B01D 39/083* (2013.01); *B01D 39/1623* (2013.01); *B01D 46/0028* (2013.01); *B01D 46/0036* (2013.01); *B01D 46/543* (2013.01); *B01J 20/205* (2013.01); *B32B 5/16* (2013.01); *B32B 9/045* (2013.01); *B32B 9/047* (2013.01); *B32B 9/06* (2013.01); *C01B 32/194* (2017.08); *B01D 39/1692* (2013.01); *B01D 2239/0407* (2013.01); *B01D 2239/0442* (2013.01); *B01D 2239/0478* (2013.01); *B01D 2239/0618* (2013.01); *B01D 2239/086* (2013.01); *B01D 2275/10* (2013.01); *B32B 2264/108* (2013.01); *B32B 2307/724* (2013.01); *B32B 2571/00* (2013.01); *C01B 2204/32* (2013.01); *C01P 2006/12* (2013.01)

(58) Field of Classification Search
CPC .............. B01D 39/083; B01D 39/1623; B01D 39/1692; B01D 39/18; B01D 39/2017; B01D 46/0028; B01D 46/0036; B01D 46/543; B01D 2239/0407; B01D 2239/0442; B01D 2239/0478; B01D 2239/0618; B01D 2239/086; B01D 2239/0266; B01D 2239/0464; B01D 2239/0492; B01D 2239/0613; B01D 2275/10; B01D 2239/0428; B32B 5/16; B32B 5/32; B32B 9/045; B32B 9/047; B32B 9/06; B32B 9/04; B32B 2264/108; B32B 2307/724; B32B 2571/00; B32B 2255/02; B32B 2255/12; B32B 3/06; B32B 5/022; B32B 5/024; B32B 5/245; B32B 5/26; B32B 27/065; B32B 27/08; B32B 27/10; B32B 2255/10; B32B 2255/102; B32B 2255/20; B32B 2255/205; B32B 2262/0223; B32B 2262/0246; B32B 2262/0261; B32B 2262/0284; B32B 2262/062; B32B 2262/14; B32B 2266/0278; B32B 2266/06; B32B 2307/7145; B32B 2307/718; B32B 2307/7265; B32B 2307/728; B32B 3/26; B32B 5/08; B32B 5/18; B32B 27/12; B32B 27/18; B32B 27/322; B32B 29/02; B32B 29/005; B32B 29/007; B32B 2262/04; B32B 2307/73; B32B 7/04; B32B 2255/24; B32B 2262/02; B32B 27/32; B32B 2255/26; B32B 2255/28; B32B 2262/023; B32B 2262/0253; B32B 2262/10; B32B 2270/00; B32B 2307/7163; B32B 2307/732; B32B 9/007; C01B 32/194; C01B 2204/32; C01B 2204/20; C01B 32/21; C01B 32/23; C01B 32/192; C01P 2006/12
See application file for complete search history.

(56) References Cited

U.S. PATENT DOCUMENTS

| | | | |
|---|---|---|---|
| 4,856,509 A | 8/1989 | Lemelson | |
| 5,363,182 A * | 11/1994 | Kuribayashi | G03G 21/0017 399/350 |
| 5,767,167 A | 6/1998 | Ferry | |
| 5,783,502 A | 7/1998 | Swanson | |
| 5,851,395 A | 12/1998 | Kawase et al. | |
| 6,182,659 B1 | 2/2001 | Kawase et al. | |
| 6,190,437 B1 | 2/2001 | Forsyth | |
| 6,379,794 B1 | 4/2002 | Girgis | |
| 6,551,608 B2 | 4/2003 | Yao | |
| 7,029,516 B2 | 4/2006 | Campbell et al. | |
| 7,071,258 B1 | 7/2006 | Jang et al. | |
| 2005/0271574 A1 | 12/2005 | Jang et al. | |
| 2007/0157932 A1* | 7/2007 | Cerbini | A41D 13/1138 128/205.27 |
| 2007/0175192 A1* | 8/2007 | Niakan | B01D 46/521 55/486 |
| 2009/0205666 A1 | 8/2009 | Bowen | |
| 2010/0313753 A1* | 12/2010 | Calis | B01D 39/2082 96/12 |
| 2014/0154770 A1* | 6/2014 | Vittadello | C25B 11/057 435/177 |
| 2014/0182602 A1 | 7/2014 | Nagao et al. | |
| 2014/0273689 A1 | 9/2014 | Carroll et al. | |
| 2015/0157969 A1 | 6/2015 | Sealey et al. | |
| 2016/0113336 A1 | 4/2016 | Shibata et al. | |
| 2016/0136553 A1 | 5/2016 | Healey et al. | |
| 2016/0262466 A1 | 9/2016 | Tsaur et al. | |
| 2016/0298266 A1 | 10/2016 | Zillig et al. | |
| 2017/0055597 A1* | 3/2017 | Lekven | A41D 13/1161 |
| 2017/0303608 A1 | 10/2017 | Chen et al. | |
| 2017/0367416 A1 | 12/2017 | Yamada | |
| 2018/0305213 A1* | 10/2018 | Lin | B01J 19/22 |
| 2018/0312406 A1* | 11/2018 | Siedle | C08K 9/04 |
| 2019/0051903 A1 | 2/2019 | Manabe et al. | |
| 2019/0352806 A1* | 11/2019 | Zhamu | C01B 32/19 |
| 2020/0196588 A1* | 6/2020 | Austin | A01M 1/026 |
| 2020/0243844 A1 | 7/2020 | Jang | |
| 2021/0140096 A1* | 5/2021 | Zhang | B01D 39/2017 |
| 2021/0307428 A1 | 10/2021 | Zhamu et al. | |
| 2021/0307429 A1 | 10/2021 | Zhamu et al. | |
| 2021/0316171 A1 | 10/2021 | Zhamu et al. | |
| 2022/0127779 A1 | 4/2022 | Zhamu et al. | |

FOREIGN PATENT DOCUMENTS

| | | | |
|---|---|---|---|
| CN | 105504341 A | 4/2016 | |
| CN | 106474819 A | 3/2017 | |
| CN | 107513894 A * | 12/2017 | .............. D21H 17/06 |
| CN | 109954329 A * | 7/2019 | .............. A41D 13/11 |
| CN | 110380014 A * | 10/2019 | .......... H01M 10/052 |
| CN | 110694351 A * | 1/2020 | |
| JP | 2016060999 A * | 4/2016 | .............. A62B 18/02 |
| KR | 1020090036136 A | 4/2009 | |
| KR | 101373049 B | 3/2014 | |
| KR | 1020140100235 A | 8/2014 | |
| KR | 20170000218 A | 1/2017 | |
| KR | 1020170000218 A | 1/2017 | |
| WO | 2017141044 A1 | 8/2017 | |
| WO | 2018006744 A1 | 1/2018 | |
| WO | WO-2018078427 A1 * | 5/2018 | ......... B01D 39/2058 |
| WO | 2018204702 A1 | 11/2018 | |
| WO | 2021203094 A1 | 10/2021 | |
| WO | 2022093889 A1 | 5/2022 | |

OTHER PUBLICATIONS

JP2016060999A_ENG (Espacenet machine translation of Tanaka) (Year: 2016).*
CN107513894A_ENG (Espacenet machine translation of Chen) (Year: 2017).*
CN110380014A_ENG (Espacenet machine translation of Peng) (Year: 2019).*

(56) References Cited

OTHER PUBLICATIONS

CN1539531A_ENG (Espacenet machine translation of Jiang) (Year: 2004).*
CN110694351A_ENG (Espacenet machine translation of Sha) (Year: 2020).*
CN104606802A_ENG (Espacenet machine translation of Sun) (Year: 2015).*
PCT/US2021/025769; International Search Report dated Jul. 29, 2021; 3 pages.
Jang et al., "Processing of Nano Graphene Platelets (NGPs) and NGP Nanocomposites: A Review" J. Materials Sci. (2008) vol. 43, pp. 5092-5101.
International Patent Application No. PCT/US21/025769; International Search Report dated Jul. 29, 2021; 3 pages.
Liu S, Zeng T H, Hofmann M, Burcombe E, Wei J, Jiang R, et al. Antibacterial Activity of Graphite, Graphite Oxide, Graphene Oxide, and Reduced Graphene Oxide: Membrane and Oxidative Stress, ACS Nano 2011; 5:6971-80 (Year: 2011).
U.S. Appl. No. 16/839,827; Non-Final Office Action dated Aug. 22, 2022; 183 pages.
U.S. Appl. No. 16/839,847; Non-Final Office Action dated Aug. 29, 2022; 171 pages.
Cui, Jianghu et al., "Preparation of graphene oxide with silver nanowires to enhance antibacterial properties and cell compatibility", RSC Advances, 2015, vol. 5, pp. 85748-85755.
International No. PCT/US2021/056745; International Search Report dated Feb. 18, 2022; 4 pages.

\* cited by examiner

GRAPHITIC ANTIVIRAL FILTRATION ELEMENT AND FILTRATION DEVICES CONTAINING SAME

The present disclosure relates generally to the field of filters and, particularly, to an antiviral filtration element, filtering devices containing this element, and a method of operating same. This disclosure is related to a filtration device that is capable of filtrating out bacteria, viruses, other air-borne particles, or liquid-borne contaminants. This device may be an oral and/or nasal air filter that can remove and neutralize harmful virus from inhaled air contaminated with such virus, and from contaminated air exhaled from patients infected with such virus. In particular, the disclosure relates to such a device in the form of a face mask. The disclosure also relates to filter materials or members suitable for use in such a face mask and other filtration devices.

BACKGROUND

The inhalation of air contaminated by harmful virus and/or other micro-organisms is a common route for infection of human beings, particularly health workers and others caused to work with infected humans or animals. It is also known that air exhaled by infected patients is a source of contamination. At the present time the risk of infection by the so called "COVID-19" coronavirus is of particular concern. Masks incorporating a suitable filter material would be ideal for use as a barrier to prevent infection by this virus.

Air filters that are believed to be capable of removing such virus and/or other micro-organisms are known in the art. One type of such a filter comprises a fibrous or particulate substrate or layer and an antiviral or anti-bacteria compound deposited upon the surface and/or into the bulk of such a substrate or layer. This compound captures and/or neutralizes virus and/or other micro-organisms of concern. Examples of disclosures of such filters are summarized below:

For instance, U.S. Pat. No. 4,856,509 provides a face mask wherein select portions of the mask contain a viral destroying agent such as citric acid. U.S. Pat. No. 5,767,167 discloses aerogel foams suited for filtering media for capture of micro-organisms such as virus. U.S. Pat. No. 5,783,502 provides a fabric substrate with anti-viral molecules, particularly cationic groups such as quaternary ammonium cationic hydrocarbon groups bonded to the fabric. U.S. Pat. No. 5,851,395 is directed at a virus filter comprising a filter material onto which is deposited a virus-capturing material based on sialic acid (9-carbon monosaccharides having a carboxylic acid substituent on the ring). U.S. Pat. No. 6,182,659 discloses a virus-removing filter based on a *Streptococcus agalactiae* culture product. U.S. Pat. No. 6,190,437 discloses an air filter for removing virus from the air comprising a carrier substrate impregnated with iodine resins. U.S. Pat. No. 6,379,794 discloses filters based on glass and other high modulus fibers impregnated with an acrylic latex material. U.S. Pat. No. 6,551,608 discloses a porous thermoplastic material substrate and an antiviral substance made by sintering at least one antiviral agent with the thermoplastic substance. U.S. Pat. No. 7,029,516 discloses a filter system for removing particles from a fluid comprising a non-woven polypropylene base upon which is deposited an acidic polymer such as polyacrylic acid.

There is an ongoing and highly urgent need to improve such filters, particularly in view of concerns about the risks from "bird flu" and corona virus. The present inventors have identified filter materials or members which may be capable of increasing the level of removal of harmful virus and/or other micro-organisms from inhaled air and neutralization of these species, enabling the use of such materials in an improved nasal and/or mouth filter. The same filter materials may also be used as a filtration member in other filter devices, such as those for purification of water and air, separation of selected solvents, and recovery of spilled oil.

SUMMARY

The present disclosure provides a filtration member for use in a filtration device, the filtration member comprising a layer of air-permeable membrane (e.g. a sheet of woven or nonwoven fabric, a porous polymeric membrane, a piece of open-cell foam, a sheet of air-breathable paper, etc.) having two primary surfaces and a layer of chemically functionalized graphite flakes deposited on at least one of the two primary surfaces or embedded in the layer of air-permeable membrane, wherein the graphite flakes comprise a chemical functional group containing 1%-50% (preferably 5% to 35%) by weight of a non-carbon element selected from O, N, H, F, Cl, Br, I, or a combination thereof.

In some embodiments, the layer of graphite flakes is chemically bonded to the at least one of the primary surfaces using an adhesive or binder.

Preferably, the layer of graphite flakes has a specific surface area from 10 to 500 $m^2/g$.

In the filtration member, the non-woven fabric preferably comprises polymer fibers selected from the group of cotton, cellulose, wool, polyolefins, polyester, polyamide, rayon, polyacrylonitrile, cellulose acetate, polystyrene, polyvinyls, poly (carboxylic acid), a biodegradable polymer, a water-soluble polymer, copolymers thereof, and combinations thereof.

In certain embodiments, the disclosed filtration member further comprises an anti- microbial compound distributed on surfaces of graphite flakes. The anti-microbial compound may comprise an antiviral or anti-bacteria compound selected from acrylic acid, methacrylic acid, citric acid, an acidic polymer, a silver-organic jodine antibacterial agent, an iodine resin, a sialic acid, a cationic group, a sulfonamide, a fluoroquinolone, hypericin, curcumin, or a combination thereof.

In some embodiments, the non-woven fabric in the filtration member comprises polymer fibers and an anti-microbial compound is distributed on surfaces of the polymer fibers. The anti- microbial compound may comprise an antiviral or anti-bacteria compound selected from acrylic acid, methacrylic acid, citric acid, an acidic polymer, a silver-organic iodine antibacterial agent, an iodine resin, a sialic acid, a cationic group, a sulfonamide, a fluoroquinolone, hypericin, curcumin, or a combination thereof.

The disclosure also provides a filtration device comprising the above-described filtration member as a functional component. The filtration device may be a water-purifying device, an air-purifying device, a solvent-removing device, an oil-recovering device, or a face mask, particularly a medical face mask or respirator.

In certain embodiments, the disclosed face mask comprises (a) a mask body configured to cover at least wearer's mouth and nose; and (b) a fastener to hold the mask in place on the wearer's face; wherein the mask body comprises (i) an air-permeable outer layer, (ii) an inner layer located on a wearer's side when the mask is worn, and (iii) the aforementioned filtration member that is disposed between the outer layer and the inner layer or embedded in the outer layer or in the inner layer.

It may be noted that the layer of woven or nonwoven fabric supporting the layer of graphite flakes may be the outer layer or the inner layer. In other words, the layer of chemically functionalized graphite flakes may be deposited on the internal surface of the outer layer or on the outer surface (opposite of the wearer's face) of the inner layer.

Thus, the present disclosure also provides a face mask comprising: (a) a mask body configured to cover at least wearer's mouth and nose; and (b) fastening device to hold the mask in place on the wearer's face (e.g. a pair of ear straps that extend from both sides of the mask body and are configured to be hooked around wearer's ears, or an elastic strap that is hooked around wearer's head); wherein the mask body includes (i) an air-permeable outer layer (e.g. a fiber sheet or piece of fabric, or a porous polymer membrane) preferably comprising a hydrophobic material (e.g. water-repelling fibers), (ii) an inner layer located on a wearer's side when the mask is worn, and (iii) a layer of chemically functionalized expanded graphite flakes disposed between the outer layer and the inner layer or totally or partially embedded in the outer layer or in the inner layer. The graphite flakes comprise chemical functional groups containing 1%-50% (preferably 5% to 35%) by weight of a non-carbon element selected from O, N, H, F, Cl, Br, I, or a combination thereof.

Generally speaking, the present disclosure also provides a face mask that comprises chemically functionalized graphite flakes as an antiviral agent, wherein the graphite flakes comprise a chemical functional group containing 1%-50% by weight of a non-carbon element selected from O, N, H, F, Cl, Br, I, or a combination thereof. Particularly useful are graphite flakes that carry chemical functional groups such as —COOH, —OH, >O, —F, —Cl, —Br, —I, and/or —$NH_2$.

In certain embodiments, the graphite flake layer is chemically bonded to a surface (e.g. the inner surface) of the outer layer or a surface (the surface facing the outer layer) of the inner layer using an adhesive or binder.

In the disclosed face mask, the graphite flakes preferably have a specific surface area from 10 to 500 $m^2/g$.

The graphite flake layer-to-outer layer weight ratio or the graphite flake layer-to-inner layer weight ratio is preferably from 1/1000 to 1/0.1, more preferably from 1/100 to 1/1, and most preferably from 5/100 to 25/100.

In some embodiments, the graphite flake layer is a discrete layer that is embedded in at least one of the outer layer or the inner layer.

In the disclosed face mask, the outer layer or the inner layer of the mask body may comprise a woven or nonwoven structure of polymer or glass fibers, a porous polymer membrane (e.g. porous PE-PP copolymer membrane, polytetrafluoroethylene or Teflon membrane), an air-breathable sheet of paper, or a combination thereof. The outer layer or the inner layer may preferably comprise polymer fibers selected from the group of cotton, cellulose, wool, polyolefins (e.g. polyethylene and polypropylene), polyester (e.g. PET), polyamide (e.g. nylon), rayon, polyacrylonitrile, cellulose acetate, polystyrene, polyvinyls, poly (carboxylic acid), a biodegradable polymer, a water-soluble polymer, copolymers thereof, and combinations thereof.

The fastener may comprise a pair of ear straps that extend from both sides of the mask body and are configured to be hooked around wearer's ears, or an elastic strap that is hooked around wearer's head.

Preferably, the graphite flake layer has an oxygen or nitrogen content from 5% to 50% by weight or halogen content from 5% to 30% based on the total graphite flake weight. The oxygen-, nitrogen-, or halogen-containing functional groups on graphite flake surfaces appear to be capable of killing or de-activating certain microbial agents.

In the disclosed face mask, the mask body may further comprise an anti-microbial compound. Preferably, the mask body further comprises an anti-microbial compound distributed on surfaces of the graphite flakes. With such a high specific surface area, the mask body enables a dramatically higher effective amount of the anti-microbial compound that can directly attack the microbial pathogens (bacteria, virus, etc.). Substantially all of the anti-microbial compound can be utilized.

The anti-microbial compound may comprise an antiviral or anti-bacteria compound selected from acrylic acid, methacrylic acid, citric acid, an acidic polymer, a silver-organic iodine antibacterial agent, an iodine resin, a sialic acid (e.g. 9-carbon monosaccharides having a carboxylic acid substituent on the ring), a cationic group (e.g. quaternary ammonium cationic hydrocarbon group bonded to the fabric or graphite flakes), a sulfonamide, a fluoroquinolone, hypericin, curcumin (including polymeric curcumin), or a combination thereof.

DESCRIPTION OF THE PREFERRED EMBODIMENTS

The present disclosure provides a filtration element (member) and a filtration device containing such a member. The filtration device may be selected from a water filter device, an air filter device, a solvent purification device, an oil-recovering device, or a face mask (e.g. a surgical face mask, a respirator, such as a N95 face mask).

The filtration member preferably comprises a layer of air-permeable membrane (e.g. a sheet of woven or nonwoven fabric, a porous polymeric membrane, a piece of open-cell foam, a sheet of air-breathable paper, etc.) having two primary surfaces and a layer of chemically functionalized graphite flakes deposited on at least one of the two primary surfaces or embedded in the layer of air-permeable membrane, wherein the graphite flakes comprise a chemical functional group containing 1%-50% (preferably 5% to 35%) by weight of a non-carbon element selected from O, N, H, F, Cl, Br, I, or a combination thereof.

In some embodiments, the layer of graphite flakes is chemically bonded to the at least one of the primary surfaces using an adhesive or binder. Preferably, the layer of graphite flakes has a specific surface area from 10 to 500 $m^2/g$.

In the filtration member, the non-woven fabric preferably comprises polymer fibers selected from the group of cotton, cellulose, wool, polyolefins, polyester, polyamide, rayon, polyacrylonitrile, cellulose acetate, polystyrene, polyvinyls, poly (carboxylic acid), a biodegradable polymer, a water-soluble polymer, copolymers thereof, and combinations thereof.

In certain embodiments, the disclosed filtration member further comprises an anti-microbial compound distributed on surfaces of graphite flakes. The anti-microbial compound may comprise an antiviral or anti-bacteria compound selected from acrylic acid, methacrylic acid, citric acid, an acidic polymer, a silver-organic iodine antibacterial agent, an iodine resin, a sialic acid, a cationic group, a sulfonamide, a fluoroquinolone, hypericin, curcumin, or a combination thereof.

In some embodiments, the non-woven fabric in the filtration member comprises polymer fibers and an anti-microbial compound is distributed on surfaces of the polymer fibers. The anti-microbial compound may comprise an antiviral or anti-bacteria compound selected from acrylic acid, methacrylic acid, citric acid, an acidic polymer, a silver-organic iodine antibacterial agent, an iodine resin, a sialic acid, a cationic group, a sulfonamide, a fluoroquinolone, hypericin, curcumin, or a combination thereof.

The disclosure also provides a filtration device comprising the above-described filtration member as a functional component. The filtration device may be a water-purifying device, an air-purifying device, a solvent-removing device, an oil-recovering device, or a face mask, particularly a medical face mask or respirator.

Figure 1:
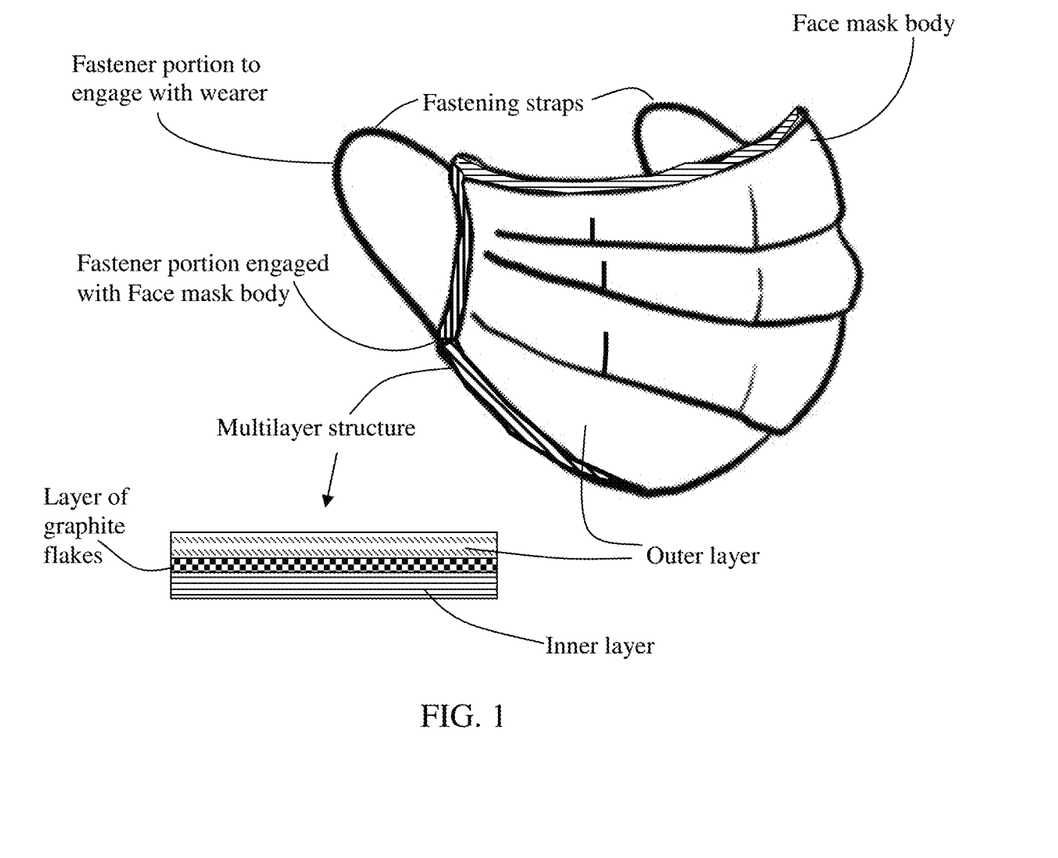
FIG. 1 Schematic of a face mask according to an embodiment of the present disclosure.

In certain embodiments, as schematically illustrated in FIG. 1, the disclosed face mask comprises: (a) a mask body configured to cover at least wearer's mouth and nose; and (b) a fastener to hold the mask in place on the wearer's face (e.g. a pair of ear straps that extend from both sides of the mask body and are configured to be hooked around wearer's ears, or an elastic strap that is hooked around wearer's head); wherein the mask body includes (i) an air-permeable outer layer (e.g. a fiber sheet or piece of fabric) preferably comprising a hydrophobic material (e.g. water-repelling fibers), (ii) an inner layer located on a wearer's side when the mask is worn, and (iii) a layer of graphite flakes disposed between the outer layer and the inner layer or totally or partially embedded in the outer layer or in the inner layer. The graphite flakes comprise a chemical functional group containing 1%-50% (preferably 5% to 35%) by weight of a non-carbon element selected from O, N, H, F, Cl, Br, I, or a combination thereof. The fastener has a portion or portions which engage the face mask body and a portion or portions of the fastener which engage with the wearer. In one embodiment a portion of the elastic straps are sewn to the face mask body, while the other portion of elastic straps wrap around the ears of the wearer.

The outer layer or the inner layer may be each a multi-ply or multi-layer structure. In some embodiments, a graphite flake layer may be embedded as one of the multiple layers in the outer layer or the inner layer. The air-permeable structure may comprise an air-permeable membrane, such as a fibrous substrate or fabric, which can either be a woven or non-woven fabric. Examples of woven materials include those natural and synthetic fibers such as cotton, cellulose, wool, polyolefins (e.g. PE and PP), polyester (e.g. PET and PBT), polyamide (e.g. nylon), rayon, polyacrylonitrile, cellulose acetate, polystyrene, polyvinyls and any other synthetic polymers that can be processed into fibers. Examples of non-woven materials include polypropylene, polyethylene, polyester, nylon, PET and PLA. For the presently disclosed device, non-woven is preferred, which may be in the form of a non-woven sheet or pad.

Non-woven polyester is a preferred air-permeable structure because some of the desired anti-viral or anti-bacteria compounds, such as an acidic polymer, adhere better to polyester material. Also preferred is polypropylene non-woven fabric. The graphite flake layers investigated herein appear to be compatible with all the polymeric fiber-based fabric structures. The grade of fibrous substrate or fabric which may be used to support graphite flakes may be determined by practice to achieve a suitable through-flow of air, and the density may be as known from the face mask art to provide a mask of a comfortable weight.

Non-woven polypropylene of the type conventionally used for surgical masks and the like is widely available in sheet form. Suitable grades of non-woven polypropylene include the well-known grades commonly used for surgical face masks. Typical non-woven polypropylene materials found suitable for use in the face mask or other filtration devices have areal weights of 10-50 $g/m^2$ (gsm). Other suitable material weights can be determined empirically without any difficulty. Typical non-woven polyester suitable for use in the filtration devices has areal weights of 10-300 $g/m^2$. For face mask applications, polyester materials of weight 20-100 $g/m^2$ are preferred. Such materials are commercially available. Other suitable materials may be determined empirically without difficulty.

Alternatively, the porous layer substrate, other than non-woven or woven fabric, may be in other forms such as an open-cell foam, e.g. a polyurethane foam as is also used for air filters. A graphite flake layer and a polymer foam layer are then bonded or laminated together to form a body of structural integrity. Alternatively, graphite flakes may be deposited onto a surface of a foam (or any other type of air-permeable membrane) using casting, coating, printing, spraying, painting, etc.

Again, face masks, including surgical masks and respirators, are commonly made with non-woven fabric, which has better bacteria filtration and air permeability while remaining less slippery than woven cloth. The material most commonly used to make them is polypropylene, but again can also be made of polystyrene, polycarbonate, polyethylene, or polyester, etc. The mask material of 20 $g/m^2$ or gsm is typically made in a spun-bond process, which involves extruding the melted plastic onto a conveyor. The material is extruded in a web, in which strands bond with each other as they cool. The 25 gsm fabric is typically made through the melt-blown process, wherein plastic is extruded through a die with hundreds of small nozzles and blown by hot air to become ultra-small fibers, cooling and binding on a conveyor. These fibers are typically less than a micron in diameter. A graphite flake layer may be combined with the polymer fabric during or after the fabric production procedure.

Surgical masks are generally composed of a multi-layered structure, generally by covering a layer of textile with non-woven bonded fabric on both sides. Non-woven materials are less expensive to make and cleaner due to their disposable nature. The structure incorporated as part of a mask body may be made with three or four layers. These disposable masks are often made with two filter layers effective in filtering out particles, such as bacteria above 1 micron. The filtration level of a mask depends on the fiber, the manufacturing process, the web structure, and the cross-sectional shape of the fiber. In the disclosed mask, the graphite flakes can be incorporated as one of the multi-layers, but preferably not directly exposed to the outside air (not the outermost layer) and not directly in contact with the face of the wearer (not the inner-most layer). Masks may be made on a machine line that assembles the nonwovens from bobbins, ultrasonically welds the layers together, and stamps the masks with nose strips, ear loops, and other pieces. These procedures are well-known in the art.

Respirators also comprise multiple layers. The outer layer on both sides may be made of a protective nonwoven fabric between 20 and 100 g/m² density to create a barrier both against the outside environment and, on the inside, against the wearer's own exhalations. A pre-filtration layer follows which can be as dense as 250 g/m². This is usually a needled nonwoven which is produced through hot calendaring, in which plastic fibers are thermally bonded by running them through high pressure heated rolls. A graphite flake layer may be used to partially or totally replace this layer. In the case of partial substitution, graphite flakes may be bonded onto a primary surface of this needled nonwoven layer. This makes the pre-filtration layer thicker and stiffer to form the desired shape as the mask is used. The last layer may be a high efficiency melt-blown electret nonwoven material, which determines the filtration efficiency. This melt-blown layer, instead of or in addition to the pre-filtration layer, may be bonded with a graphite flake layer.

The surfaces of graphite flakes may be deposited with an anti-viral or anti-bacterial compound. This deposition may be conducted before or after the graphite flakes form into a layer. The anti-microbial compound may comprise an anti-viral or anti-bacteria compound selected from acrylic acid, methacrylic acid, citric acid, an acidic polymer, a silver-organic iodine antibacterial agent, an iodine resin, a sialic acid (e.g. 9-carbon monosaccharides having a carboxylic acid substituent on the ring), a cationic group (e.g. quaternary ammonium cationic hydrocarbon group bonded to the fabric or graphene sheets), a sulfonamide, a fluoroquinolone, hypericin, curcumin (including polymeric curcumin), or a combination thereof.

It has been found that acidic polymers are effective at capturing and neutralizing virus in air passing through such a filtration member (substrate) featuring an acidic polymer. Without being limited to a specific theory, it is believed that upon contact with the surface of the substrate the virus interact with the polymer, are entrapped and the localized low pH environment (e.g. pH value of 2.8 to 5) of the acidic polymer inactivates the virus. It is believed that the filter member and filtration device containing such a member herein disclosed may be effective in this manner against the virus that cause colds, influenza, SARS, RSV, bird flu, corona virus, and mutated serotypes of these.

Poly-(carboxylic acid) polymers, as examples of acidic polymers, are typically polymers which include —COOH groups in their structure, or derivative groups such as acid-anhydride groups, readily cleavable carboxylic acid ester groups which readily cleave to yield —COOH groups. A poly-(carboxylic acid) polymer may have its —COOH groups (or derivative groups) directly linked to its backbone, or the polymer may be a so-called grafted or dendritic polymers in which the —COOH (or derivative) groups are attached to side chains branching off from the backbone.

The functionalized expanded graphite flakes as disclosed herein can be readily made to contain —COOH groups on their surfaces or edges. These functionalized groups carried by the graphite flakes are also expected to be antiviral as well.

Generally speaking, the present disclosure also provides a face mask that comprises chemically functionalized graphite flakes as an antiviral agent, wherein the graphite flakes comprise a chemical functional group containing 1%-50% by weight of a non-carbon element selected from O, N, H, F, Cl, Br, I, or a combination thereof. Particularly useful are graphite flakes that carry chemical functional groups such as —COOH, —OH, >O, —F, —Cl, —Br, —I, and/or —NH$_2$.

It is imperative that face masks and respirators produced are sterilized before being sent out of the factory.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

Figure 2A:
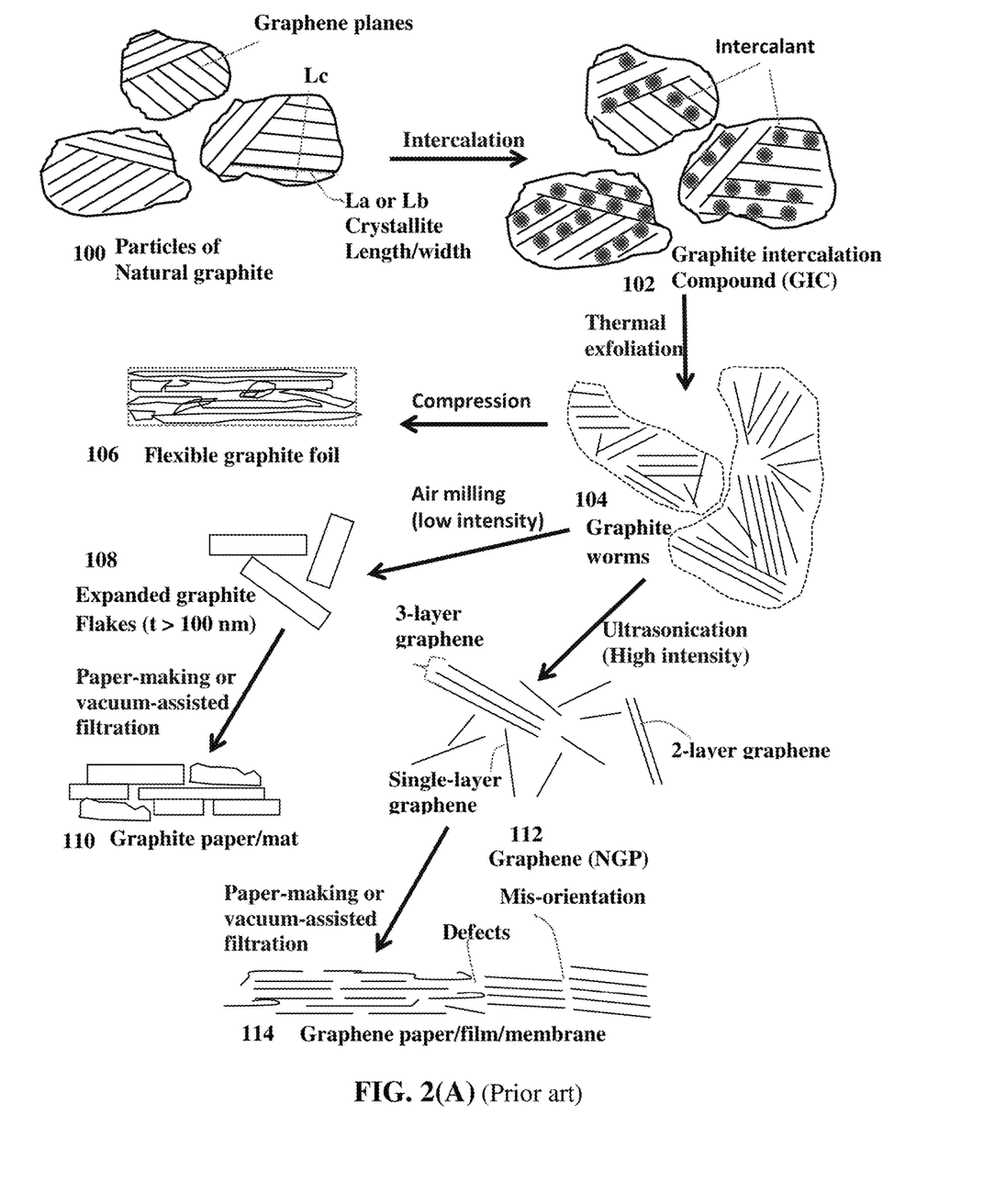
FIG. 2(A) Schematic drawing illustrating the processes for producing intercalated and/or oxidized graphite, subsequently exfoliated graphite worms, and expanded graphite flakes.

As schematically illustrated in the upper portion of FIG. 2(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon microbeads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range from 0.32-0.35 nm, which do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

Figure 2B:
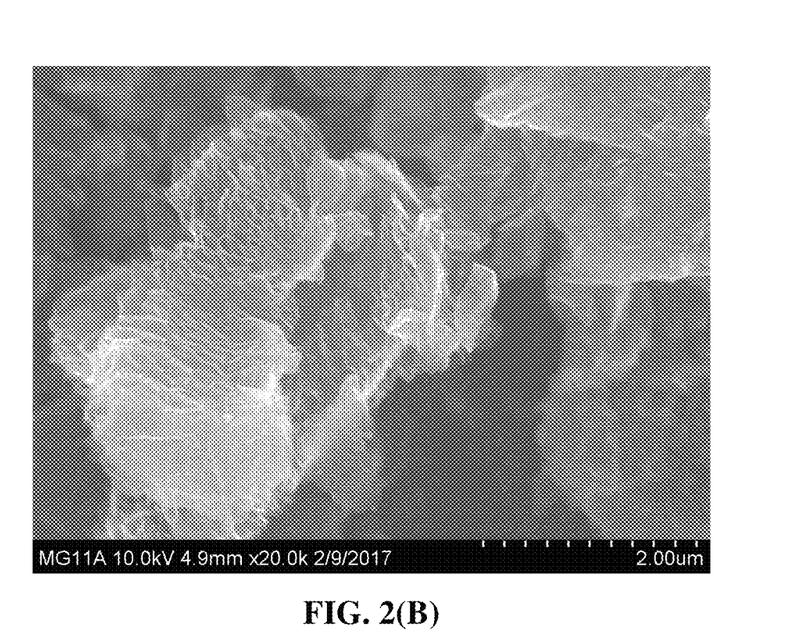
FIG. 2(B) An SEM image of exfoliated carbon (exfoliated carbon worms), containing interconnected graphite flakes; upon exposure to low-intensity air jet milling, these worms become isolated expanded graphite flakes.
Figure 2C:
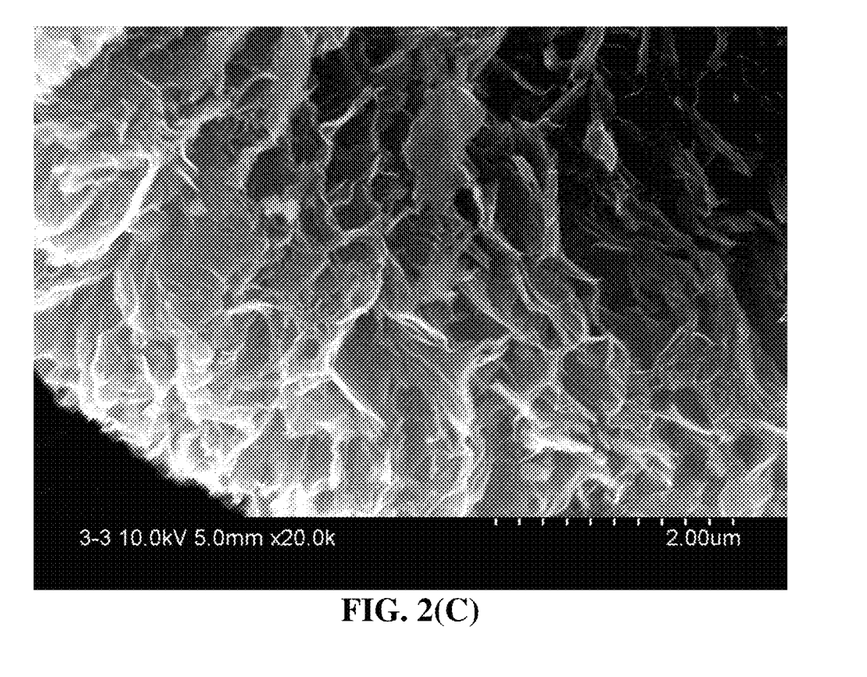
FIG. 2(C) Another SEM image of graphite worms, containing interconnected graphite flakes; upon exposure to low-intensity air jet milling, these worms become isolated expanded graphite flakes.
Figure 2D:
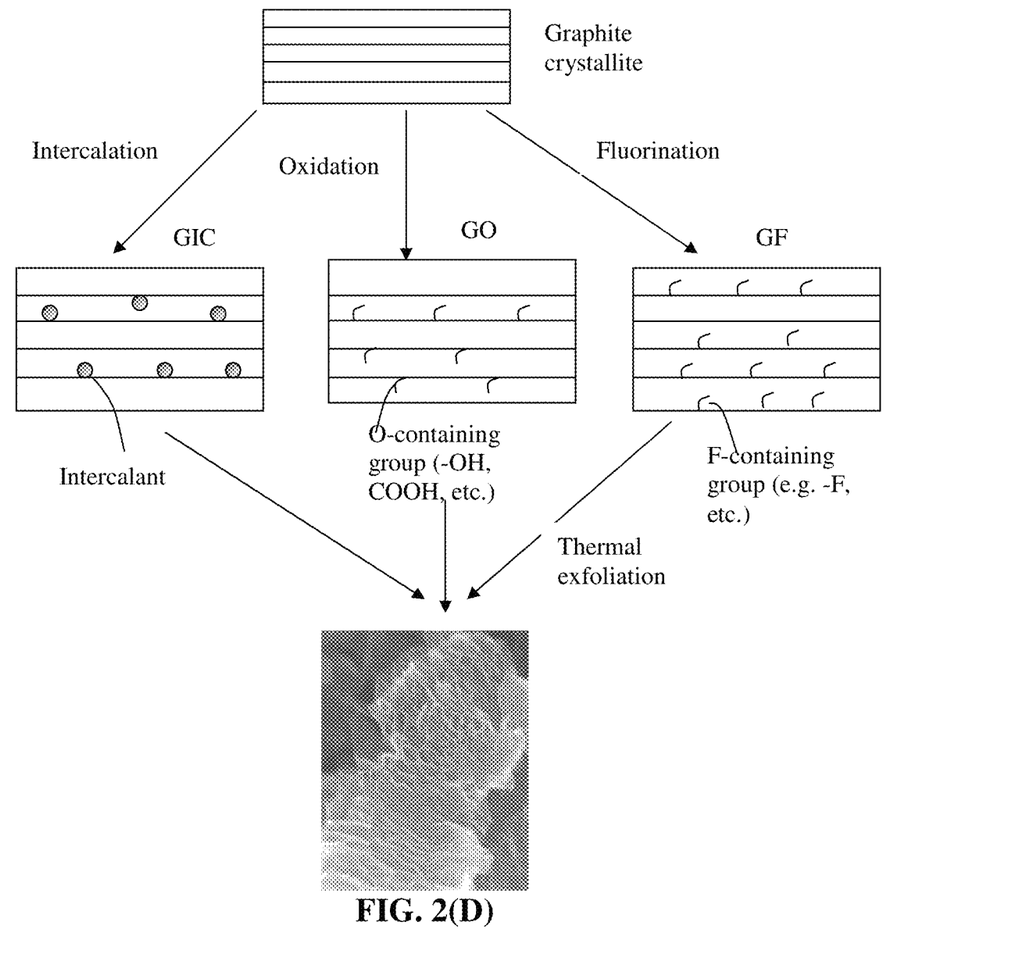
FIG. 2(D) Schematic drawing illustrating the approaches of producing thermally expanded/exfoliated graphite structures containing interconnected graphite flakes; upon exposure to low-intensity air jet milling, these worms become isolated expanded graphite flakes.
Figure 3A:
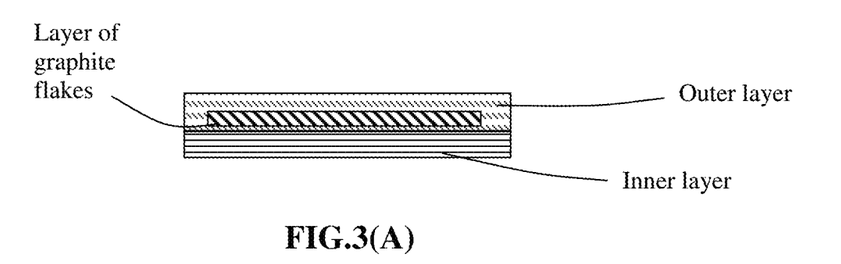
FIG. 3(A) Schematic of a multi-layer structure according to an embodiment wherein the layer of graphite flakes is a discrete layer that is embedded in the inner layer.
Figure 3B:
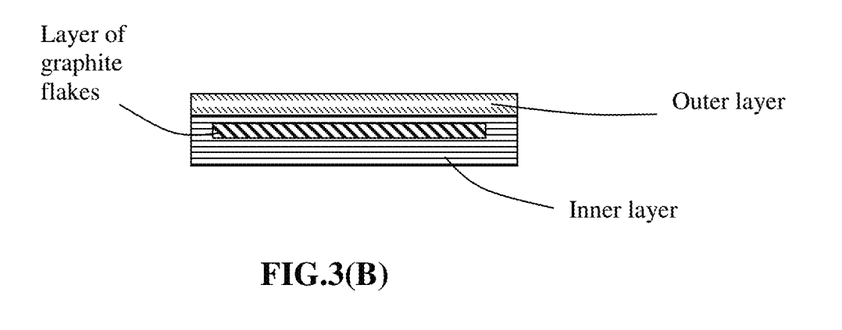
FIG. 3(B) Schematic of a multi-layer structure according to an embodiment wherein the layer of graphite flakes is a discrete layer that is embedded in the outer layer.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 2(D). The presence of an intercalant, oxygen-containing group, or fluorine-containing group serves to increase the spacing between two graphene planes in a graphite crystallite.

The inter-planar spaces between certain graphene planes may be significantly increased (actually, exfoliated) if the graphite/carbon material having expanded d spacing is exposed to a thermal shock (e.g. by rapidly placing this carbon material in a furnace pre-set at a temperature of typically 800-2,500° C.) without constraint (i.e. being allowed to freely increase volume). Under these conditions, the thermally exfoliated graphite/carbon material appears like worms, wherein each graphite worm is composed of many graphite flakes remaining interconnected (please see FIG. 2(C)). However, these graphite flakes have inter-flake pores typically in the pore size range of 20 nm to 10 µm. These worms may be broken up (e.g. using airjet mill) to produce isolated expanded graphite flakes.

Alternatively, the intercalated, oxidized, or fluorinated graphite/carbon material having expanded d spacing may be exposed to a moderate temperature (100-800° C.) under a constant-volume condition for a sufficient length of time. The conditions may be adjusted to obtain a product of limited exfoliation, having inter-flake pores of 2-20 nm in average size. This is herein referred to as a constrained expansion/exfoliation treatment. We have surprisingly observed that an Al cell having a cathode of graphite/carbon having inter-planar spaces 2-20 nm is capable of delivering a high energy density, high power density, and long cycle life.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 2(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 2(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range from 0.42-2.0 nm, more typically in the range from 0.5-1.2 nm. It may be noted than the "expandable graphite" is not "expanded graphite" (to be further explained later).

Upon exposure of expandable graphite to a temperature in the range from typically 800-2,500° C. (more typically 900-1,050° C.) for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIG. 2(B) and FIG. 2(C)). In exfoliated graphite, individual graphite flakes (each containing 1 to several hundred of graphene planes stacked together) are highly spaced from one another, having a spacing of typically 2.0 nm-10 µm. However, they remain physically interconnected, forming an accordion or worm-like structure.

In graphite industry, graphite worms can be re-compressed to obtain flexible graphite sheets or foils (106) that typically have a thickness in the range from 0.1 mm (100 µm)-0.5 mm (500 µm).

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. Expanded graphite flakes typically have the same or similar inter-planar spacing (typically 0.335-0.36 nm) of their original graphite. Multiple expanded graphite flakes, preferably after chemical functionalization, may be sprayed over or coated onto a surface of a non-woven fabric layer to produce a filtration member.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (U.S. Pat. Pub. No. 2005/0271574) (now abandoned). Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation has been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g. at 800-1,050° C.) and allowed to freely expand, the final product is exfoliated graphite worms.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

It may be noted that expanded graphite flakes (with or without oxygen-containing species attached thereto) may be exposed to gas molecules of $F_2$, $Br_2$, $Cl_2$, or $I_2$, to produce expanded graphite flakes having F-, Br-, Cl-, or I-containing functional groups.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x \leq 2$) can one observe a $Cl_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material or expanded graphite flakes to ammonia at high temperatures (200-400° C.). Nitrogenation may also be conducted at lower temperatures by a hydrothermal method; e.g. by sealing GO and ammonia in an autoclave and then increased the temperature to 150-250° C.

In addition to N, O, F, Br, Cl, or H, the presence of other chemical species (e.g. Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well, particularly when the spaces are from 2.0 nm to 20 nm. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing. The spacing may be dramatically expanded (exfoliated) to have inter-flake pores that are 20 nm-10 μm in size (e.g. by exposing the Na- or Li-intercalated graphite to water or a mixture of water and alcohol).

The process of making face masks may comprise a step of incorporating the graphite flake-enhanced filtration material (member) into a mask body, which is fitted with a fastener (e.g. elastic straps) to form the face mask.

The graphite flaks can be made to contain microscopic pores (<2 nm), meso-scaled pores having a pore size from 2 nm to 50 nm, or larger pores (preferably 50 nm to 1 μm). Based on well-controlled pore size alone, the instant graphite flake layer supported by a fabric can be an exceptional filter material for air or water filtration.

Further, the graphite flake surface chemistry can be independently controlled to impart different amounts and/or types of functional groups to graphite flakes (e.g. as reflected by the percentage of O, F, Cl, Br, I, N, H, etc. in the flakes). In other words, the concurrent or independent control of both pore sizes and chemical functional groups at different sites of the porous graphite flake layer provide unprecedented flexibility or highest degree of freedom in designing and making graphite flake-coated fabric that exhibits many unexpected properties, synergistic effects, and some unique combination of properties that are normally considered mutually exclusive (e.g. some part of the structure is hydrophobic and other part hydrophilic; or the filtration structure is both hydrophobic and oleophilic). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water. The present method allows for precise control over hydrophobicity, hydrophilicity, and oleophilicity.

The present disclosure also provides an oil-removing, oil-separating, or oil-recovering device, which contains the presently invented graphene foam layer-bonded fabric as an oil-absorbing or oil-separating element. Also provided is a solvent-removing or solvent-separating device containing the graphite flake layer-bonded fabric as a solvent-absorbing element.

A major advantage of using the instant graphite flake-bonded fabric structure as an oil-absorbing element is its structural integrity. Due to the notion that graphite flake layer can be of high structural integrity and the structure may be chemically bonded by an adhesive to a fabric layer, the resulting structure would not get disintegrated upon repeated oil absorption operations.

Another major advantage of the instant technology is the flexibility in designing and making oil-absorbing elements that are capable of absorbing oil up to a large amount yet still maintaining its structural shape (without significant expansion). This amount depends upon the specific pore volume of the filtration structure.

The disclosure also provides a method to separate/recover oil from an oil-water mixture (e.g. oil-spilled water or waste water from oil sand). The method comprises the (a) providing an oil-absorbing element comprising a chemically functionalized graphite flake layer-bonded fabric; (b) contacting an oil-water mixture with the element, which absorbs the oil from the mixture; and (c) retreating the oil-absorbing element from the mixture and extracting the oil from the element. Preferably, the method comprises a further (d) reusing the element.

Additionally, the disclosure provides a method to separate an organic solvent from a solvent-water mixture or from a multiple-solvent mixture. The method comprises (a) providing an organic solvent-absorbing element comprising an integral graphite flake layer-bonded fabric structure; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains (e) of reusing the solvent-absorbing element.

The following examples are used to illustrate some specific details about the best modes of practicing the instant disclosure and should not be construed as limiting the scope of the disclosure.

Example 1: Production of Graphite Flakes Through Oxidation of Graphite, Thermal Expansion/Exfoliation of Oxidized Graphite, and Air Jet Milling Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulfate ions. The filtrate was tested intermittently with barium chloride to determine if sulfate ions are present. The HCl washing step was repeated until this test was negative. The GO was then washed repeatedly with deionized water until the pH of the filtrate was neutral. The GO slurry was spray-dried and stored in a vacuum oven at 60° C. and then subjected to free thermal exfoliation (1,050° C. for 2 minutes) to obtain thermally exfoliated graphite worms. The graphite worms were then exposed to light-intensity air milling to produce isolated expanded graphite flakes (having thickness typically from 15 nm to 150 nm). Expanded graphite flakes are found to carry some amounts of chemical functional groups, such as —COOH, —OH, and >O.

Expanded graphite flakes were then immersed in a water solution of $H_2O_2$ (30% by weight) to impart additional oxygen-containing functional groups, particularly —COOH, to these graphite flakes.

Certain graphite flakes were also exposed to ammonia, chlorine, fluorine, and bromine gases, separately, to produce different functional groups, containing —$NH_2$, —Cl, —F, and —Br, respectively.

Example 2: Preparation of Graphite Oxide (GO) Using a Modified Hummers' Method

Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35.degree. C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. Some of the powder was subsequently exfoliated in a furnace, pre-set at 950° C., for 1 minute to obtain thermally exfoliated graphite worms.

Some of the graphite worms were poured into a household food processor and sheared for 10 minutes to obtain expanded graphite flakes. Expanded graphite flakes, having 6% to 20% oxygen content, were dispersed in water to form a suspension, which was spray-coated onto a surface of a PP non-woven cloth to form a filtration member.

Example 3: Oxidation and Exfoliation of Meso-Carbon Micro-Beads (MCMBs)

Graphite oxide was prepared by oxidation of meso-carbon micro-beads (MCMBs) according to the same procedure used in Example 1. MCMB microbeads were supplied by China Steel Chemical Co. (Taiwan). This material has a density of about 2.14 $g/cm^3$; a particle size of 25 microns; and an inter-planar distance of about 0.336 nm. After deep oxidation treatment, the inter-planar spacing in the resulting graphite oxide micro-beads is approximately 0.76 nm. Upon exfoliation for 2 minutes at 350° C., the exfoliated carbon worms have flakes having a thickness from 3 nm-15 nm.

Some of the exfoliated carbon worms were then dispersed in an acidic solution (containing citric acid dissolved in water) to form a slurry. The slurry was then painted over a PP non-woven fabric sheet and, upon removal of water, an antiviral filtration member was obtained. The member contained citric acid dispersed on graphite flake surfaces and some dispersed on PP fiber surfaces.

Example 4: Fluorination of Graphite to Produce Exfoliated and Expanded Graphite Fluoride Flakes Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 5A) having an empirical formula $(CF_{0.75})_n$. X-ray diffraction indicated a major (002) peak at $2\theta=13.5$ degrees, corresponding to an inter-planar spacing of 6.25 Å. Some of the graphite fluoride powder was thermally exfoliated to form graphite worms, which were air jet-milled to obtain expanded graphite fluoride flakes. These graphitic flakes were then dispersed in a water solution of Polyacrylic acid (2%) to form a suspension, which was sprayed over a non-woven fabric sheet to form an antiviral filtration member after water was dried.

Example 5: Halogenation of Expanded Graphite Fluoride Flakes

A sample of expanded graphite fluoride ($CF_{068}$) obtained in EXAMPLE 4 was exposed at 250° C. and 1 atmosphere to vapors of 1,4-dibromo-2-butene ($BrH_2C$—CH=.CH—.$CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product is mixed halogenated graphite, likely a combination of graphite fluoride and graphite bromide. These halogenated graphite flakes were then painted on a sheet of melt-blown PP fabric, which was then laminated between an outer layer and an inner layer of fabric to form a face mask.

We claim:

1. A filtration member for use in a filtration device, said filtration member comprising a layer of air-permeable membrane, having two primary surfaces and a layer of chemically functionalized graphite flakes deposited on at least one of the two primary surfaces or embedded in the layer of air-permeable membrane, wherein said graphite flakes comprise a chemical functional group containing from 1% to 50% by weight of a non-carbon element selected from N, Cl, Br, I, or a combination thereof;
wherein the air-permeable membrane is selected from a porous
polymeric membrane, a piece of open-cell foam, or a combination thereof.

2. The filtration member of claim 1, wherein said layer of graphite flakes is chemically bonded to said at least one of the primary surfaces using an adhesive or binder.

3. The filtration member of claim 1, wherein the layer of graphite flakes has a specific surface area from 10 to 500 $m^2/g$.

4. The filtration member of claim 1, further comprising an anti-microbial compound distributed on surfaces of the graphite flakes.

5. The filtration member of claim 4, wherein the anti-microbial compound comprises an antiviral or anti-bacteria compound selected from acrylic acid, methacrylic acid, citric acid, an acidic polymer, a silver-organic iodine antibacterial agent, an iodine resin, a sialic acid, a cationic group, a sulfonamide, a fluoroquinolone, hypericin, curcumin, or a combination thereof.

6. A filtration device comprising the filtration member of claim 1.

7. The filtration device of claim 6, which is a water-purifying device, an air-purifying device, a solvent-removing device, or an oil-recovering device.

8. The filtration device of claim 6, which is a face mask.

9. A face mask for use by a wearer having a face, mouth, and nose, the facemask comprising:
 a) a mask body configured to cover at least the wearer's mouth and nose; and
 b) a fastener to hold the mask in place on the wearer's face, the fastener including a portion that engages with the mask body and a portion that engages with the wearer;
 wherein the mask body comprises (i) an air-permeable outer layer, (ii) an inner layer located on an inner side of the mask body, and (iii) the filtration member of claim 1 that is disposed in the mask body.

10. A face mask for use by a wearer having a face, mouth, and nose, the facemask comprising:
 A) a mask body configured to cover at least the wearer's mouth and nose; and
 B) a fastener to hold the mask in place on the wearer's face, the fastener including a portion that engages with the mask body and a portion that engages with the wearer;
 wherein the mask body comprises (i) an air-permeable outer layer, (ii) an inner layer located on an inner side of the mask body, and (iii) a layer of chemically functionalized graphite flakes disposed in the mask body, wherein the graphite flakes comprise a chemical functional group containing 1%-50% by weight of a non-carbon element selected from N, Cl, Br, I, or a combination thereof;
 wherein the air-permeable outer layer includes material selected from a porous polymeric membrane, a piece of open-cell foam, or a combination thereof.

11. The face mask of claim 10, wherein the layer of chemically functionalized graphite flakes has a specific surface area from 10 to 500 $m^2/g$.

12. The face mask of claim 10, wherein the outer layer or the inner layer comprises a woven or non-woven structure of polymer fibers or glass fibers, a porous polymer membrane, an air-breathable sheet of paper, or a combination thereof.

13. The face mask of claim 10, wherein the fastener comprises a pair of ear straps that extend from both sides of the mask body and are configured to be hooked around wearer's ears, or an elastic strap that is hooked around wearer's head.

14. The face mask of claim 10, wherein the outer layer or the inner layer comprises polymer fibers selected from the group of cotton, cellulose, wool, polyolefins, polyester, polyamide, rayon, polyacrylonitrile, cellulose acetate, polystyrene, polyvinyls, poly (carboxylic acid), a biodegradable polymer, a water-soluble polymer, copolymers thereof, and combinations thereof.

15. A face mask comprising chemically functionalized graphite flakes as an antiviral agent, wherein the graphite flakes comprise a chemical functional group containing 1%-50% by weight of a non-carbon element selected from N, Cl, Br, I, or a combination thereof;
    wherein the face mask includes material selected from a porous polymeric membrane, a piece of open-cell foam, or a combination thereof.

16. A face mask for use by a wearer having a face, mouth, and nose, the facemask comprising:
    A) a mask body configured to cover at least the wearer's mouth and nose; and
    B) a fastener to hold the mask in place on the wearer's face, the fastener including a portion that engages with the mask body and a portion that engages with the wearer;
    wherein the mask body comprises (i) an air-permeable outer layer, (ii) an inner layer located on an inner side of the mask body, and (iii) a layer of chemically functionalized graphite flakes disposed in the mask body, wherein the graphite flakes comprise a chemical functional group containing 1%-50% by weight of a non-carbon element selected from N, Cl, Br, I, or a combination thereof, wherein said layer of chemically functionalized graphite flakes is chemically bonded to a surface of the outer layer or a surface of the inner layer using an adhesive or binder;
    wherein the air-permeable outer layer includes material selected from a porous polymeric membrane, a piece of open-cell foam, or a combination thereof.

* * * * *